Patented Aug. 11, 1931

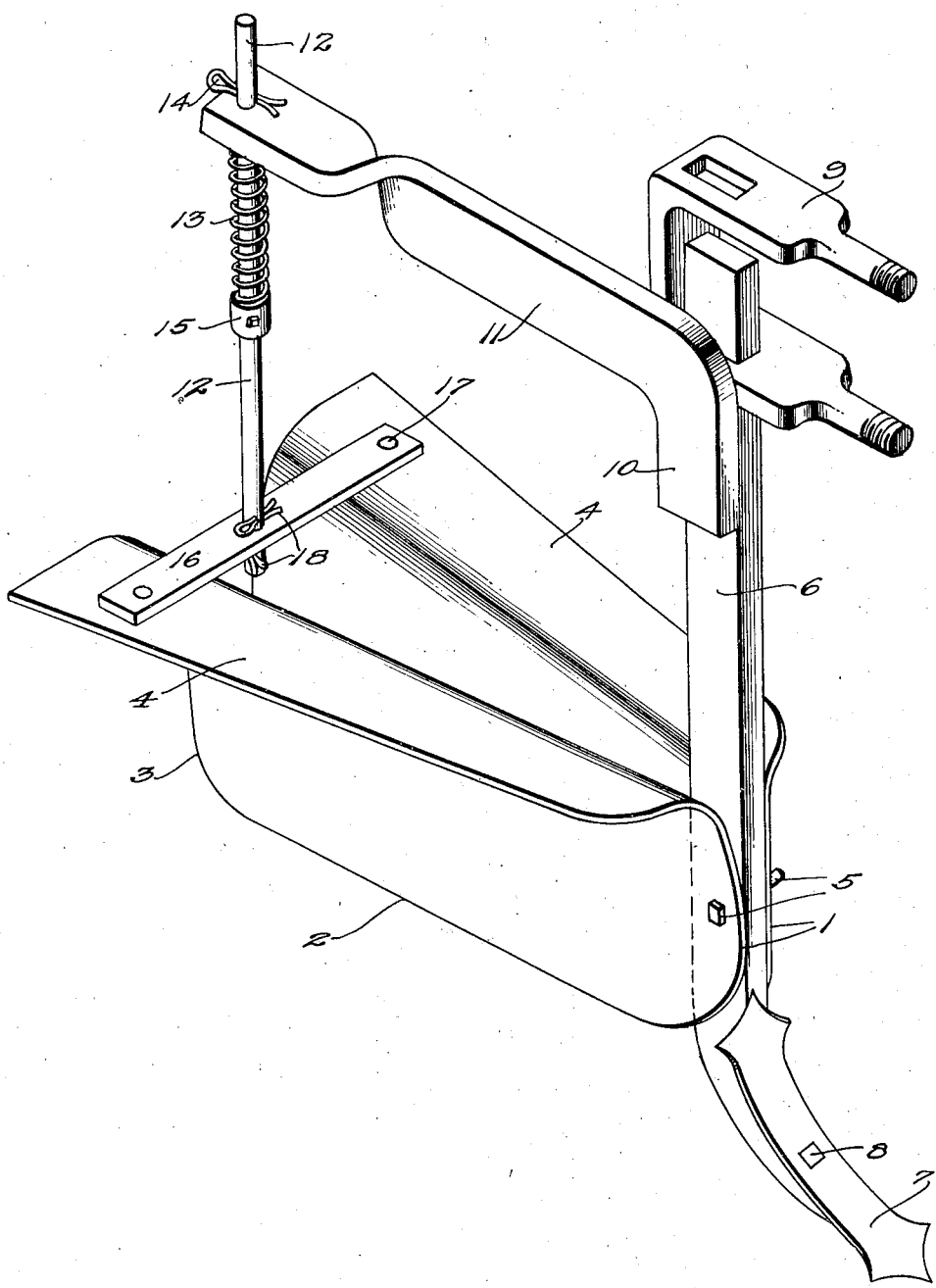

1,818,529

UNITED STATES PATENT OFFICE

ANDREW J. BOCKWITZ, OF TWIN FALLS, IDAHO, ASSIGNOR OF ONE-HALF TO GRAFTON H. SELF, OF TWIN FALLS, IDAHO

SOIL CORRUGATOR

Application filed February 28, 1927. Serial No. 171,547.

This invention relates to improvement in soil corrugators and means for attaching it to the tool bar of a cultivator, corrugator or the like, of which the following is a full, clear, and exact description.

The purpose of this invention is to provide a simple, economic and mechanically operating device in certain of its movements and the making of a better corrugation for irrigating purposes.

A further object is the ease with which this corrugator can be pivotally attached to a shank, or said shank attached with the tool bar of a cultivator and the like.

Further objects of this invention will appear in the description comprising the various novel features of construction and arrangement of parts as will be more fully described and set forth in appended claims.

Referring to the drawing there is shown a perspective view of my corrugator and its attachments.

Similar characters of reference are used to donate corresponding parts in accompanying drawing, and the following description.

Referring more particularly to the drawing reference numeral 1 indicates the front end of the corrugator, 2 the bottom, 3 the rear, 4 the upper outer side flanges, 5 means for pivotally attaching the front end of the corrugator to the shank, 6 the corrugator shank, 7 the bull nose, 8 means for attaching the shovel to the end of the corrugator shank, 9 one form of means for attaching the ends of the corrugator shank and the supporting brace 11 at point 10 to the cultivator and corrugator tool bars or the like, supporting rod 12 slidably engages an opening in the supporting brace bar 11, cotter pin 14 passing through the rod above said bar. Surrounding the rod 12 below the brace bar 11 is compression spring 14, the tension of which is regulated by a set screw controlled collar 15. Secured to the horizontal flanges 4 near their rear ends by suitable means 17 is a cross bar 16. Rod 12 passes through this bar and is held in fixed relation thereto by means of cotter pins 18 extending through rod 12 above and below bar 16.

Heretofore corrugators for irrigation of the soil have been of such construction, that they would raise the soil like a plough, and cause the loose soil to roll over the sides, and in some instances cover and destroy the plants, and permit said lose soil to drop into the corrugation back of the corrugator.

In my construction the above undesirable features and effects are practically eliminated.

The shovel of suitable size on the end of the shank is for opening up the soil and forming a suction. The front end of the corrugator is closely fitted to the sides of the shank and pivotally attached to same. It is narrow in front to its vertical height, round at the bottom, and increases in width to its rear, and has the upper sides flanged outward.

During the operation of the soil corrugator, it trails in the furrow or opening in the soil made by the shovel of the soil opening means, pressing the soil laterally and downward, and the upper outer flanges press and hold the soil down from raising and rolling over onto the plants and from falling back into the corrugation, the rear end of the corrugator being supported by an upright rod, passing through an adjustable collar, and through a compression spring, and a supporting brace, with said spring contacting with the collar and the upper supporting brace, which can be adjusted by the collar to any desired tension, for flexible movement to the rear end of the corrugator when coming in contact with any hard objects in the soil.

The said upper end of the corrugator shank and supporting brace are positioned and adaptable for attaching same to the tool bar of a cultivator, corrugator or the like with means of their regular equipment.

Having described my invention I claim:

1. In combination, soil opening means, and a soil corrugator pivotally attached at its front end to the said soil opening means, said corrugator comprising a metal plate bent upon itself to form a rounded bottom, with vertical sides diverging towards the rear and having their upper portions turned outward to form horizontal flanges.

2. In combination, soil opening means, the upper end of said means being adapted for attaching to the tool bar of a cultivator or the like, and a soil corrugator pivotally attached at its front end to the soil opening means, said corrugator comprising a metal plate bent upon itself to form a rounded bottom, with vertical sides diverging towards the rear and having the upper portions turned outward to form horizontal flanges.

3. In combination, soil opening means, a soil corrugator pivotally attached at its front end to the said soil opening means, said corrugator comprising a metal plate bent upon itself to form a rounded bottom, with vertical sides diverging towards the rear and having the upper portions turned outward to form horizontal flanges, a supporting brace bar adaptable to be positioned for attaching to the tool bar of a cultivator or the like, and means for yieldingly supporting the rear of the corrugator therefrom.

4. In combination, soil opening means, the upper end of said means being adapted to be attached to the tool bar of a cultivator or the like, a soil corrugator pivotally attached at its front end to the soil opening means, said corrugator comprising a metal plate bent upon itself to form a rounded bottom, with vertical sides diverging towards the rear and having the upper portions turned outward to form horizontal flanges for forming pressed soil corrugations by pressing the soil laterally and downward, a brace bar support for the rear end of said corrugator adaptable to be positioned for attaching to the tool bar of a cultivator or the like, a rod passing through an opening in said bar, a cotter pin secured in the rod above the bar, a compression spring surrounding the rod below the bar, a set screw controlled collar below the spring, and a cross bar immovably secured to the rear end of the corrugator, the rod passing through the said cross bar and being held in fixed relation thereto by cotter pins above and below the bar.

In testimony whereof I affix my signature.

ANDREW J. BOCKWITZ.